D. MILLER.
VARIABLE SPEED TRANSMISSION DEVICE.
APPLICATION FILED DEC. 22, 1913.
1,224,868.
Patented May 1, 1917.
2 SHEETS—SHEET 1.
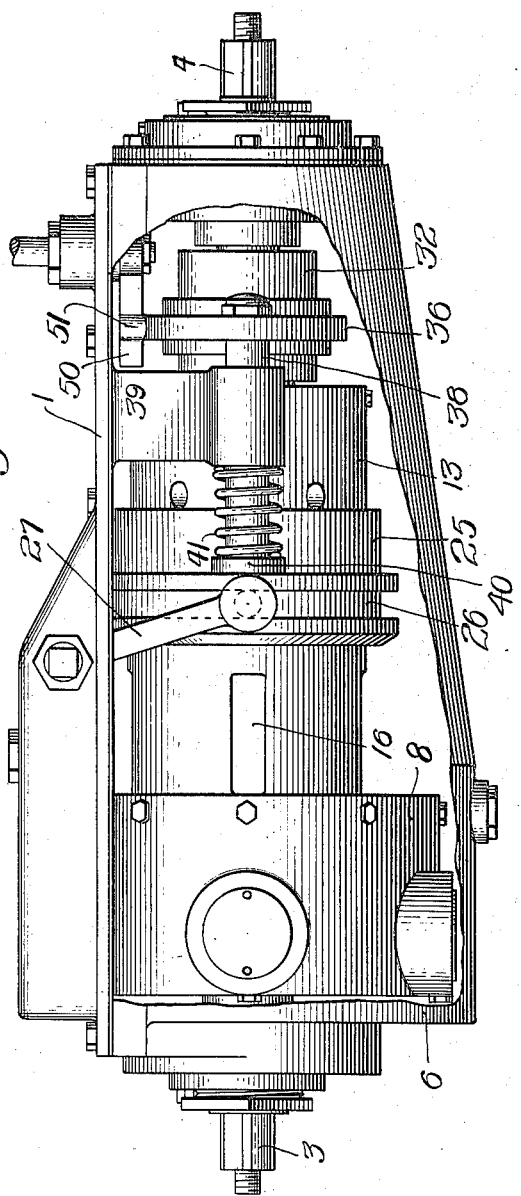
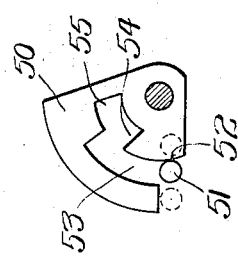

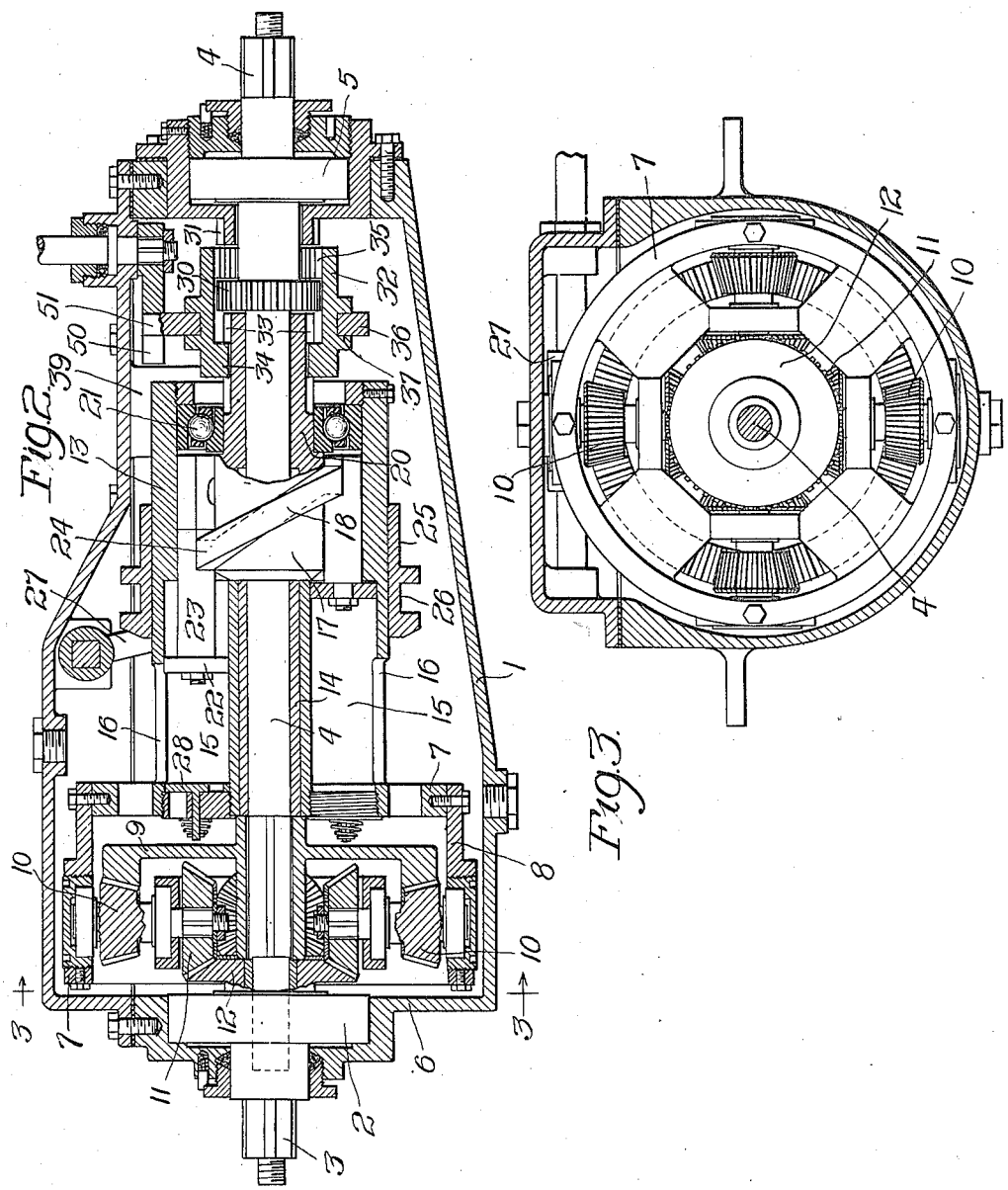

UNITED STATES PATENT OFFICE.

DORR MILLER, OF CHICAGO, ILLINOIS, ASSIGNOR TO MILLER TRANSMISSION COMPANY, A CORPORATION OF MAINE.

VARIABLE-SPEED-TRANSMISSION DEVICE.

1,224,868.

Specification of Letters Patent.

Patented May 1, 1917.

Application filed December 22, 1913. Serial No. 808,074.

*To all whom it may concern:*

Be it known that I, DORR MILLER, a citizen of the United States, residing at Chicago, county of Cook, State of Illinois, have invented a certain new and useful Improvement in Variable-Speed-Transmission Devices, and declare the following to be a full, clear, and exact description of the same, such as will enable others skilled in the art to which it pertains to make and use the same, reference being had to the accompanying drawings, which form a part of this specification.

My invention has for its object to produce a simple and efficient mechanism adapted to be placed between a driving member and a driven member for the purpose of connecting them together and operating them at a wide range of relative speed.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a side elevation of a mechanism arranged in accordance with one form of my invention, a portion of the casing being broken away in order more clearly to disclose parts hidden thereby;

Fig. 2 is a longitudinal axial section through the mechanism;

Fig. 3 is a section taken approximately on line 3—3 of Fig. 2; and

Fig. 4 is a plan view of the locking plate for the reversing means.

Referring to the drawings, 1 represents a closed casing preferably approximately circular in cross section. Extending into one end of the casing and supported in a suitable bearing, 2, therein is a driving shaft, 3; while a driven shaft, 4, extends axially into the casing from the other end where it is supported in a suitable bearing, 5. The driving shaft, 3, extends only a short distance into the casing while the driven shaft extends entirely across the casing and has one end telescoped within the inner end of the driving shaft.

Spaced apart from the end, 6, of the casing through which the driving shaft projects is the cylindrical member, 7, of a hydraulic transmission device of the same general form as that illustrated in my prior application 690,782 filed April 15, 1912. Fixed to the member 7 is a cylindrical flange, 8, extending into proximity to the head 6 and forming with the head a chamber for containing a gear mechanism adapted to afford any desired leverage between the driving shaft and the driven shaft when the transmission mechanism is initially thrown in. In the arrangement illustrated, there is fixed upon the driven shaft within the gear chamber a large bevel gear, 9, meshing with a series of distributed pinions, 10, suitably supported within the member 8 so that their axes extend radially of the driven shaft. Connected with each of the pinions 10 is a bevel pinion, 11, which in turn meshes with a bevel gear, 12, fixed upon the driving shaft. With this arrangement a rotation of the driving shaft tends to drive the member 8 and therefore the member 7 of the transmission device in the same direction as that in which the driving shaft rotates, the pinions 10, through their engagement with the wheel 9 tending to drive this wheel in the opposite direction. By suitably controlling the member 7 so as to permit it to move at a gradually decreasing speed relative to the driven shaft and finally clutching it thereto, the driven shaft may be started very slowly relative to the speed of the driving shaft; thus giving the driving shaft a powerful leverage in starting and affording a wide range of relative speeds between the two shafts. On the other hand, by gradually retarding the movement of the member 7 and finally clutching it to the stationary casing, the driven shaft may be caused to be driven through the bevel gear, 9, which, however, travels in the opposite direction from the member 7 and therefore serves to drive the driven shaft in the reverse direction relative to the driving shaft.

It will of course be understood that the mechanism for controlling the member 7 of the transmission device may take various forms. For the sake of brevity, however, and since the gear mechanism which I have just described is particularly applicable thereto, I shall confine the detailed description to the hydraulic mechanism which I have illustrated.

Connected to or forming part of the member 7 is a cylinder, 13, surrounding the intermediate portion of the driven shaft and, for convenience, bearing upon a suitable anti-friction sleeve, 14, arranged upon the shaft. In the end of the member 13 adjacent to the member 7 are a series of cylindrical chambers, 15, having their axes parallel with the axis of the driven shaft and each having an elongated port, 16, opening outwardly through the exterior of the member 13 at the end nearest the member 7. The other end of the member 13 is made hollow so as to provide a large cylindrical chamber in which is arranged a cylindrical cam block, 17, having on the periphery a continuous cam rib, 18, extending around the same in a plane diagonal to the axis of the driven shaft; the cam block being revolubly supported upon the driven shaft so as to bring the cam rib concentric with the shaft. The cam block has an elongated tubular hub, 20, extending therefrom out beyond the end of the member 13. One end of the member 13 may conveniently be supported by means of a suitable ball or roller bearing, 21, arranged between the same and the hub portion of the cam block. In each of the cylindrical chambers 15 is a piston, 22, having a rod, 23, extending into the cam chamber and provided with a notch or groove, 24, for receiving the cam rib. It will thus be seen that as the member 13 is rotated relative to the cam block, the pistons in following the cam member, are caused to reciprocate.

Surrounding the member 13 is a valve in the form of a sleeve, 25, slidably fitting on the member 13 and of an axial length sufficient to close all of the ports, 16, when the valve is moved into proximity to the member 7. The valve may be operated in any suitable way. In the arrangement shown, the valve has a peripheral groove, 26, extending circumferentially around the same, and there is a suitable actuating arm or lever, 27, having a part projecting into the groove; the parts being so proportioned and arranged that when the actuating arm is oscillated it causes the valve 25 to slide back and forth between a position in which the ports 16 are fully open and a position in which these ports are completely closed.

If desired, each of the cylindrical chambers 15 may be provided with an inwardly opening check valve 28 in the wall formed by the member 7.

Upon the driven shaft between the end of the hub 20 of the cam member and the adjacent end of the casing is fixed a gear wheel, 30, and a similar gear wheel, 31, is fixed to or made a part of the adjacent head of the casing. Surrounding the gear wheel 30 and the adjacent end of the hub 20 is a cup-shaped clutch member, 32, having an opening through the portion which forms the bottom of the cup through which the hub member passes; the opening being just large enough to receive the hub and permit the member 32 to be slidably supported on the hub. The hub is provided with one or more keyways, 33, into which extend projections, 34, on the member 32 so as to hold the latter against rotation relative to the hub. At the open end of the member 32 is an internal gear, 35, adapted to mesh with either the gear 30 or the gear 31 or to occupy an idle position between these two gears and out of mesh with both. When the gear 35 meshes with the gear 30 the cam member 17 is locked to the driven shaft; while upon engaging the gear 35 with the gear 31, the cam member is locked to the casing and is therefore held against rotation. When the gear 35 is in its intermediate position the mechanism is idle.

The member 32 may be actuated in any suitable way. In the arrangement shown, there is a ring, 36, fitting loosely into an annular groove, 37, surrounding the member 32. A post, 38, is fixed at one end to the ring 36 and extends along beside the member 13 parallel with the driven shaft, the post extending through a stationary bearing bracket, 39, forming part of or secured to the casing. On the free end of the post is a head, 40, and between the head and the bracket 39 is a spring, 41, under sufficient initial tension to draw the post far enough through the bearing bracket to bring the gear member 35 on the member 32 into mesh with the gear 30, when the spring is free to act. The parts are so proportioned that the head 40 is adapted to engage either with the adjacent face of the valve sleeve 25 or with the actuating arm, 27. The parts are also so proportioned that when the valve 25 is thrown into its open position, the clutch member 32 is brought into its neutral position, a further movement of the valve serving to shift the clutch member into the reverse position; and, as the valve is moved from the position indicated in Figs. 1 and 2 into the position in which the valve begins to close the ports 16, the spring 41 is left free to throw the clutch member 32 into the position to bring the gears 30 and 35 into mesh and thus clutch the cam member 17 to the driven shaft.

I prefer so to arrange the parts that after the member 32 has been moved into its reverse position, the gear member 35 meshing with the member 31, it must be locked in this position in order to permit the valve 25 to be operated. In the drawings I have shown a simple device which serves not only to lock the movable clutch member in the reverse position but also to prevent the movable clutch member from being shifted suddenly from the forward position to the reverse position without stopping at neutral. In the arrangement illustrated, there is supported by the casing just over the movable clutch member 32 a disk, 50, adapted to swing about an axis extending radially to the axis of the driven shaft. On the ring 36 is an upwardly projecting pin, 51, extending into the plane of the member 50. The member 50 has a shoulder, 52, for engaging with the pin 51 in a neutral position and preventing the movable clutch member from being carried into the reverse position. From this shoulder extends a groove, 53, concentric with the axis of oscillation of the member 50 and having at its inner end a radial branch, 54, from which extends a lateral branch, 55. When the parts are in the positions indicated in Figs. 1, 2 and 4 the clutch member is in its neutral position but may be moved into the forward position. In order to bring the movable clutch member into the reverse position, however, it is necessary to oscillate the plate 50 so as to carry the pin 51 through the slot or groove 53 and opposite the end of the branch 54. When this has been done, the pin 51, and therefore the movable clutch member, is free to move into the reverse position. A further movement of the plate 50, so as to bring the pin 51 into the branch 55 locks the pin and therefore the movable clutch member in the reverse position. It will thus be seen that the clutch cannot be thrown from forward to reverse or vice versa without stopping at the neutral position and allowing sufficient time to shift the plate 50.

The operation is as follows, assuming that the casing is filled with a liquid, preferably oil, at least to a level above the highest point of the cylindrical member 13: When the driving shaft is rotated, the clutch being in the neutral position, as illustrated, the gear mechanism at the driving shaft end is operated in the manner heretofore described, tending to drive the member 7 and therefore the cylinder 13 in the same direction as the driving shaft and to drive the bevel gear 9 in the opposite direction. The bevel gear, being fixed to the driven shaft, offers a resistance to movement and therefore the member 7 and the member 13 begin to rotate; the member 13 offering little resistance because the ports 16 are wide open and therefore the pistons, even if they do reciprocate, meet with very little resistance. However, the cam member 17 is at this time loose on the driven shaft and the members 13 and 17 can therefore rotate together. When the valve 25 is moved toward the left, as viewed in Figs. 1 and 2, the clutch is thrown into its forward position clutching the cam member 18 to the driven shaft, and then the valve begins to cover the ports 16. As soon as the cam member is clutched to the shaft it leaves only the member 13 which can rotate relative to the shaft, and therefore the pistons 22 necessarily reciprocate if there is any rotation of the member 13 relative to the driving shaft, and any resistance encountered by the pistons serves to retard this rotary movement. As an appreciable closing of the port 16 occurs, the movement of the pistons is resisted and therefore there is a tendency for the pistons to turn the shaft through the cam. When this tendency becomes great enough to overcome the load on the driven shaft, the latter begins to turn and the gear 9 turns with it, thus reducing the speed of the member 7 relative to the member 9. As the closing of the ports continues, the resistance which the pistons encounter becomes greater and greater so that the shaft is driven faster and faster until finally, when the ports are completely closed, the shaft is driven at the same rate as the member 13; or, in other words, the members 7 and 9 rotate at the same speed and therefore the rotation of the pinions 10 and 11 about their axes ceases and the members 7 and 9 and therefore the driven shaft are turned at the same speed as the driving shaft.

When it is desired to actuate the driven shaft in the reverse direction from the driving shaft, the clutch is first thrown into reverse and locked as heretofore explained, and then the valve 25 is actuated so as gradually to close the ports, as before. When the clutch is in its reverse position, the cam member is locked to the casing and therefore the only effect of the cam on the pistons is to reciprocate the pistons, the pistons meeting greater and greater resistance as the valve becomes more nearly closed until the resistance to rotation of the member 13 and the member 7 is greater than the resistance to rotation of the driven shaft, whereupon the gear wheel 9 will follow its natural tendency of turning in the direction opposite to that in which the driving shaft is rotated, so that the driven shaft is operated in the reverse direction through the member 9 of the gear mechanism. As the resistance of the pistons increases, the speed at which the member 13 rotates decreases until finally, when the valve is completely closed, the member 13 remains stationary, being locked to the cam which in turn is locked to the stationary casing.

It will be seen that by providing the gear mechanism between the member 7 and the driving shaft, any desired leverage may be obtained in starting the driven shaft and moreover, the hydraulic mechanism is never required to operate at a high speed, the speed being highest at the start and decreasing to zero as the load on the driving shaft increases. Consequently the hydraulic mechanism is allowed to operate at speeds low enough to make it not only successful but also highly efficient.

While I have illustrated and described with particularity only a single preferred form of my invention, I do not desire to be limited to the exact structural details thus illustrated and described, but intend to cover all forms and arrangements which come within the terms employed in the definitions of my invention constituting the appended claims.

I claim:

1. In combination, a driving shaft, a driven shaft revoluble independently of and alined with the driving shaft, two gears each fixed to one of the shafts, a member revoluble about the axis of said shafts, connected pinions journaled on said member and each meshing with one of said gears and forming a driving connection between them, a part revolubly mounted on the driven shaft, means for clutching said part to the driven shaft or to a fixed support, and means for gradually clutching the aforesaid member to the said part.

2. In combination, a driving shaft, a driven shaft revoluble independently of and alined with the driving shaft, two bevel gears each fixed to one of said shafts, a member revoluble about the axis of said shafts, pinions journaled on said member so as to revolve about axes radial to said shafts, said pinions meshing with said gears and forming a driving connection between them, a part revolubly mounted on the driven shaft, means for clutching said part to the driven shaft or to a fixed support, and means for gradually clutching the said member to the said part.

3. In combination, a driving shaft, a driven shaft revoluble independently of and alined with the driving shaft, two bevel gears each fixed to one of said shafts, a member revoluble about the axis of said shafts, pinions journaled on said member so as to revolve about axes radial to said shafts, said pinions meshing with said gears and forming a driving connection between them, a second member revoluble about the axis of said shafts, means for clutching said second member at will either to the driven shaft or to a fixed support, and means for gradually clutching said members together.

4. In combination, a driving shaft, a driven shaft revoluble independently of and alined with the driving shaft, two bevel gears each fixed to one of said shafts, a member revoluble about the axis of said shafts, pinions journaled on said member so as to revolve about axes radial to said shafts, said pinions meshing with said gears and forming a driving connection between them, a second member revoluble about said axis, means for gradually clutching said members together, and a clutch device for connecting said second member to a fixed support.

5. In combination, a driving shaft, a driven shaft revoluble independently of and alined with the driving shaft, two bevel gears each fixed to one of said shafts, a member revoluble about the axis of said shafts, pinions journaled on said member so as to revolve about axes radial to said shafts, said pinions meshing with said gears and forming a driving connection between them, a second member revoluble about said axis, a hydraulic clutch connecting said members together, and a clutch for connecting said second member to the driven shaft.

6. In combination, a driving shaft, a driven shaft revoluble independently of and alined with the driving shaft, two bevel gears each fixed to one of said shafts, a member revoluble about the axis of said shafts, pinions journaled on said member so as to revolve about axes radial to said shafts, said pinions meshing with said gears and forming a driving connection between them, a second member revoluble about said axis, a hydraulic clutch for gradually clutching said members together, and a clutch for clutching said second member either to the driven shaft or to a fixed support.

7. In combination, a driving shaft, a driven shaft revoluble independently of and alined with the driving shaft, two gears each fixed to one of said shafts, one of said gears being larger in diameter than the other, a member revoluble about the axis of said shafts, two connected pinions journaled on said member so as to be revoluble about an axis radial to the axis of said shafts, each of said pinions meshing with one of said gears, a part revolubly mounted on the driven shaft, means for clutching said part to the driven shaft or to a fixed support, and means for gradually clutching said member to said part.

8. In combination, a driving shaft, a driven shaft revoluble independently of and alined with the driving shaft, two gears each fixed to one of the shafts, a member revoluble about the axis of said shafts, connected pinions journaled on said member and meshing with said gears to form a driving connection between them, and a hydraulic clutch for gradually clutching said member to the driven shaft or to a fixed support.

In testimony whereof, I sign this specification in presence of two witnesses.

DORR MILLER.

Witnesses:
  Wm. F. Freudenreich,
  Ruth E. Zettervall.